(12) United States Patent
Karan

(10) Patent No.: US 7,574,002 B2
(45) Date of Patent: Aug. 11, 2009

(54) MECHANICAL KEY LOCK FOR PORTABLE ELECTRONIC DEVICES AND PORTABLE ELECTRONIC DEVICES INCLUDING THE SAME

(75) Inventor: Bilgi Karan, Malmö (SE)

(73) Assignee: Sony Ericsson Mobile Communication AB, Lund (SE)

( * ) Notice: Subject to any disclaimer, the term of this patent is extended or adjusted under 35 U.S.C. 154(b) by 618 days.

(21) Appl. No.: 11/281,077

(22) Filed: Nov. 17, 2005

(65) Prior Publication Data
US 2007/0117597 A1    May 24, 2007

(51) Int. Cl.
*H04M 1/00* (2006.01)
*H04M 9/00* (2006.01)

(52) U.S. Cl. .............................. 379/433.07; 379/433.12; 455/575.4

(58) Field of Classification Search ............ 379/433.01, 379/433.06, 433.07, 433.11, 433.12; 455/90.3, 455/556.2, 550.1, 575.1, 575.4
See application file for complete search history.

(56) References Cited

U.S. PATENT DOCUMENTS

| | | | |
|---|---|---|---|
| 4,557,574 A | 12/1985 | Kohno et al. | |
| 6,397,078 B1 | 5/2002 | Kim | |
| 2002/0154906 A1 | 10/2002 | Mikami et al. | |

FOREIGN PATENT DOCUMENTS

| | | |
|---|---|---|
| EP | 1 298 909 | 4/2003 |
| GB | 2 347 894 | 9/2000 |

OTHER PUBLICATIONS

International Search Report and Written Opinion for PCT/EP2006/004051; Date of mailing Jul. 13, 2007.

*Primary Examiner*—Tuan D Nguyen
(74) *Attorney, Agent, or Firm*—Myers Bigel Sibley & Sajovec

(57) ABSTRACT

An electronic device includes a housing and a keypad arranged on an outer surface of the housing. The housing furthermore includes a displaceable portion which is displaceable between a "locked" position in which the keypad is deactivated and an "active" position in which the keypad is activated.

19 Claims, 3 Drawing Sheets

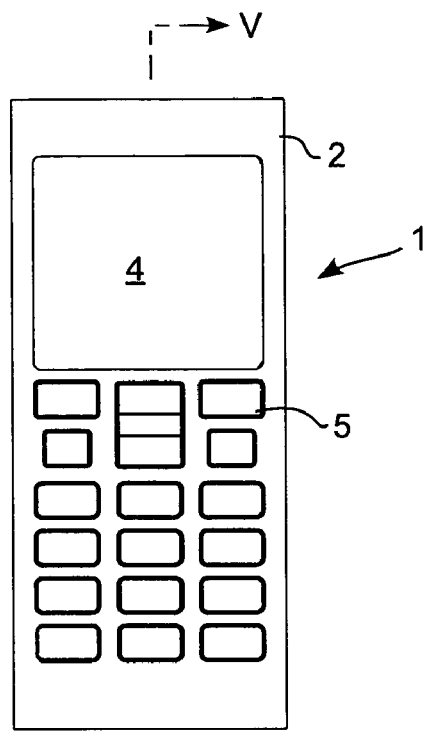
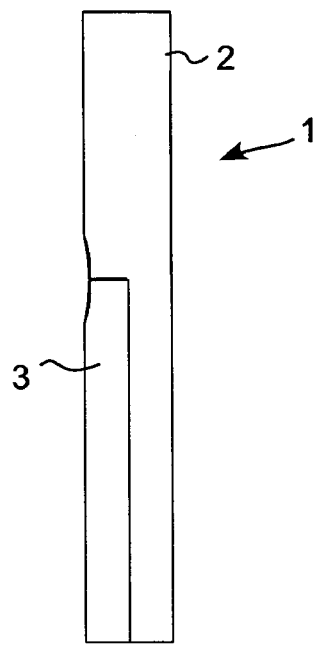
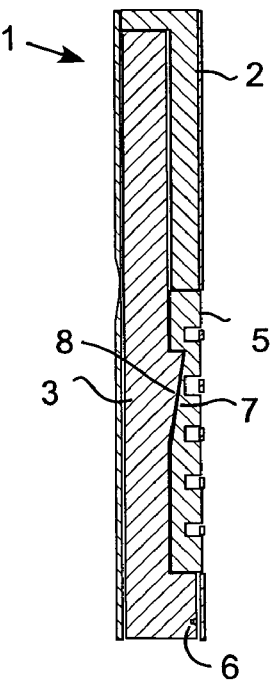
Fig. 3    Fig. 4    Fig. 5
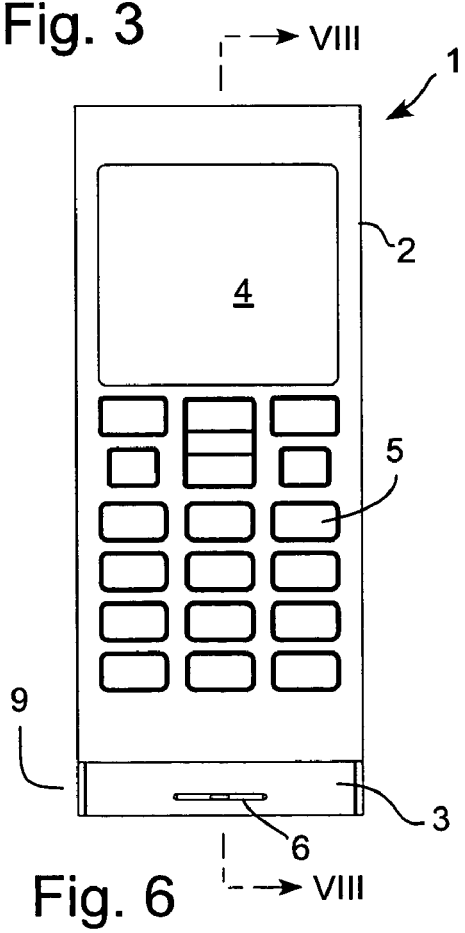
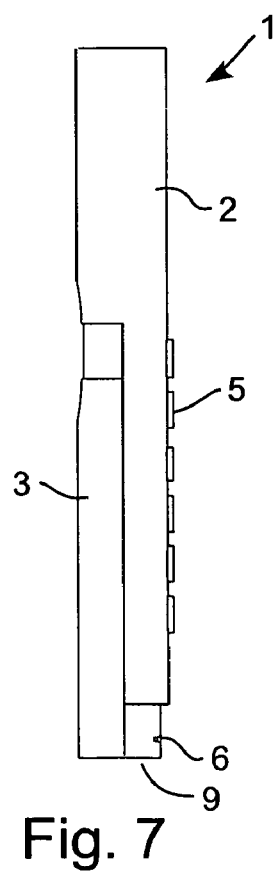
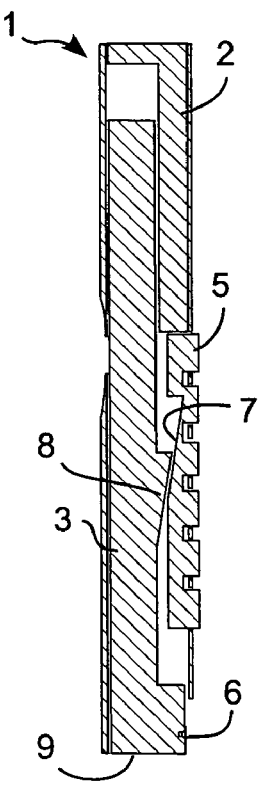
Fig. 6    Fig. 7    Fig. 8

MECHANICAL KEY LOCK FOR PORTABLE ELECTRONIC DEVICES AND PORTABLE ELECTRONIC DEVICES INCLUDING THE SAME

FIELD OF THE INVENTION

The present invention relates to portable electronic devices, and more particularly, to portable electronic devices including a housing and a keypad arranged on an outer surface of the housing.

BACKGROUND

Mobile telephones with exposed keypads may have the disadvantage that during handling of the mobile phone, a key can unintentionally be pressed, thereby causing some sort of undesired action to be taken by the mobile phone. For example, when a mobile telephone is being carried in a user's pocket, a key on the keypad of the mobile phone can accidentally be pressed, causing the mobile phone to initiate a call without the user being aware of it.

Therefore, most mobile phones are equipped with a "key lock" function. The "key lock" function "locks" the keypad when it is not in use in order to prevent unwanted actions from being performed.

This problem has typically been addressed in one of two ways. The first way is to mechanically cover the keypad when it is not in use. The second way is with a software based key lock function.

One example of a phone which makes use of the first way is a clamshell type phone. Clamshell phones are very intuitive for the user to use. However, clamshell phones need to be opened before they can be used, which may be annoying to certain users. Furthermore, clamshell phones may typically be more complex, due to the fact that the phone comprises two parts connected by a hinge. Since electrical signals need to pass through the hinge joint, the hinge joint is usually quite complex. Due to this extra complexity, the robustness of the phone may be reduced. Clamshell phones may also typically be thicker than other types of phones.

Another type of phone which covers the keypad when it is not in use is a mobile phone with a sliding cover. However, the sliding motion required to activate the phone may be rather large, since the entire keypad may need to be uncovered. This large sliding movement may also be annoying to some users. In addition, it may be easy to damage the sliding cover, since it may extend a rather large distance from the phone when the keypad is in its active state.

Recently, another type of phone has been introduced where the phone is split into two parts which are slideably or pivotably connected to each other, and in which the first part contains the keypad and the second part contains the display. However, these types of phones may have a rather complex electro-mechanical interface whereby the part containing the keypad is connected to the main part of the phone. This may increase the cost and/or decrease the robustness of the phone. These types of phones may also typically be thicker than other types of phones.

One example of the second way of providing a key lock function is where the user is forced to push two specific keys in a certain order to activate the phone. For example, the user may need to press the "clear" key followed by the "yes" key. Another way of implementing a key lock function is where the user must hold a certain key down for a certain amount of time. Software based solutions are less intuitive than the mechanical cover element and can confuse some users. It is also possible for the user to forget the combination required to open the phone, which can happen when a user uses multiple phones. Another disadvantage with the software-based key lock routines is that when the phone is in its locked state, each time that a key is accidentally pressed, the key lock routine is activated in order to check if this was an accidental key press or the first event of the unlocking routine. This activity may consume unnecessary battery power. Another problem with software-based methods is that the user may be forced to check the display of the phone in order to see if the key lock is activated. It is not possible to be able to determine the status of the key lock function, for example, just by looking at the phone or by touching the phone Another type of key lock function is disclosed Japanese Publication JP 2005167455, which discloses an extra key that is used to activate and deactivate the key lock. The key may be a monostable key, that is, it may be spring biased into one position. This is similar to the software based solution, but instead of having to remember a combination or a certain key to press, the user can always activate the same key. However, this solution may have some of the problems mentioned above with respect to the software-based solutions. In addition, since modern mobile phones are becoming smaller and smaller, it may not be desirable to have extra keys cluttering the surface of the mobile phone.

SUMMARY

Some embodiments of the present invention may provide an electronic device in which the keypad can be deactivated and activated in an intuitive manner, and which may allow a user to easily detect the status of the key lock without being required to consciously look at the display.

Some embodiments of the invention provide an electronic device which may prevents accidental activation when being carried in a pocket.

Furthermore, some embodiments of the invention may provide an electronic device which does not require any extra keys which occupy unnecessary space on the surface of the mobile phone to implement a key lock function.

Some embodiments of the invention may provide an electronic device that does not require complex electro-mechanical solutions.

An electronic device according to some embodiments of the invention include a housing having a displaceable portion which is displaceable between a "locked" position in which the keypad is deactivated and an "active" position in which the keypad is activated. In this way, a device is provided which may be very intuitive to use. It may also be very easy for the user to remember how to activate and deactivate the keypad since no special combinations need to be remembered.

In addition, since the status of the key lock function may be determined by a displaceable portion of the housing, the user may easily determine the status of the key lock function just by glancing at the device, and/or just by touching the device. The user may not be required to look at the display to determine the status. Moreover, since it is a part of the housing which is displaceable, no extra surface area may be needed on the housing for extra keys in order to control the key lock function.

In some embodiments, the displaceable portion can be arranged on the housing such that a greater portion of the keypad is exposed in both the "locked" and the "active" position of the displaceable portion. In this way, the total displacement of the displaceable portion may not have to be particularly large, since the displaceable portion may not have to cover and uncover the entire keypad. This may decrease the amount of time and effort the user needs to use in order to switch between the locked and active states.

In some embodiments, the displaceable portion can be slideably arranged with respect to the rest of the housing. The displaceable portion could for example be slid a distance of between 0 and 2 cm when sliding between the "locked" and "active" positions. A sliding action may be intuitive for the user and may be easy for the user to perform. A short sliding motion may allow the key lock to be activated or deactivated very quickly.

In another preferred embodiment, in the "locked" position of the displaceable portion, the keys of the keypad can be mechanically immobilized, which may protect the keypad mechanism from wear. It may also give the user a positive feedback as to the status of the key lock status.

In other embodiments, in the "locked" position of the displaceable portion, the keypad can be electronically disconnected from the CPU of the electronic device. In this way, accidental key presses may not consume any unnecessary battery power.

In order to prevent accidental displacements of the displaceable portion of the housing, the displaceable portion may include a locking element to prevent the displaceable portion from displacing when it is in the "locked" position. This is not necessary for all embodiments of a displaceable portion. For example, in the case, where the displaceable portion is a sliding panel on the rear of the device and the sliding panel does not extend past the housing in either the locked or the active positions, an extra locking element could be desired.

The displaceable portion could also be arranged such that in the "active" position of the displaceable portion, the displaceable portion of the housing extends past the periphery of the remainder of the housing. One benefit of this arrangement is that the useable space of the device may be increased. For example, if the device is a phone and the displaceable portion extends past the bottom of the phone in the active position, then the bottom row of keys may be easier to access since the phone lies better in the user's hand. Furthermore, if the device extends in length in the active position, then accidental activations may be reduced, since it may be difficult for the device to be extended accidentally.

In a further embodiment, the part of the displaceable portion which extends past the periphery of the housing in the "active" position of the displaceable portion could include additional functional elements. For example, the extending part could include a microphone, extra buttons, an antenna, etc.

In another embodiment, the displaceable portion could be arranged on the side of the housing opposite to the side of the housing including the keypad.

An electronic device according to some embodiments of the invention may include an angled feature provided at an interface between the displaceable portion and the keypad. The angled feature may be arranged to urge the keypad outwardly from the housing when the displaceable portion may be moved away from the housing. In particular, the keypad may be displaced outwardly from the housing when the displaceable portion may be moved into the "active" position, and the keypad may be retracted back into the housing when the displaceable portion may be moved in to the "locked" position. An angled feature may be on the displaceable portion and/or on the keypad.

An electronic device could also be provided which makes use of a one or more features presented above without making use of a displaceable portion of the housing. For example, an electronic device could be provided which includes means for mechanically immobilizing the keys of the keypad when the electronic device is put into a locked state by the user. For example this could be arranged by pressing a button, by sliding a cover element, by collapsing a clamshell phone, etc.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIG. 3 shows a front view of the mobile phone of FIG. 1 where the displaceable portion of the housing is in its "locked" position;

FIG. 4 shows a side view of the mobile phone of FIG. 1 where the displaceable portion of the housing is in its "locked" position;

FIG. 5 shows a side cross section view, defined by the line V-V in FIG. 3, of the mobile phone of FIG. 1 where the displaceable portion of the housing is in its "locked" position;

FIG. 6 shows a front view of the mobile phone of FIG. 1 where the displaceable portion of the housing is in its "active" position;

FIG. 7 shows a side view of the mobile phone of FIG. 1 where the displaceable portion of the housing is in its "active" position;

FIG. 8 shows a side cross section view, defined by the line VIII-VIII in FIG. 6, of the mobile phone of FIG. 1 where the displaceable portion of the housing is in its "active" position;

DETAILED DESCRIPTION OF EMBODIMENTS OF THE INVENTION

Figure 1:
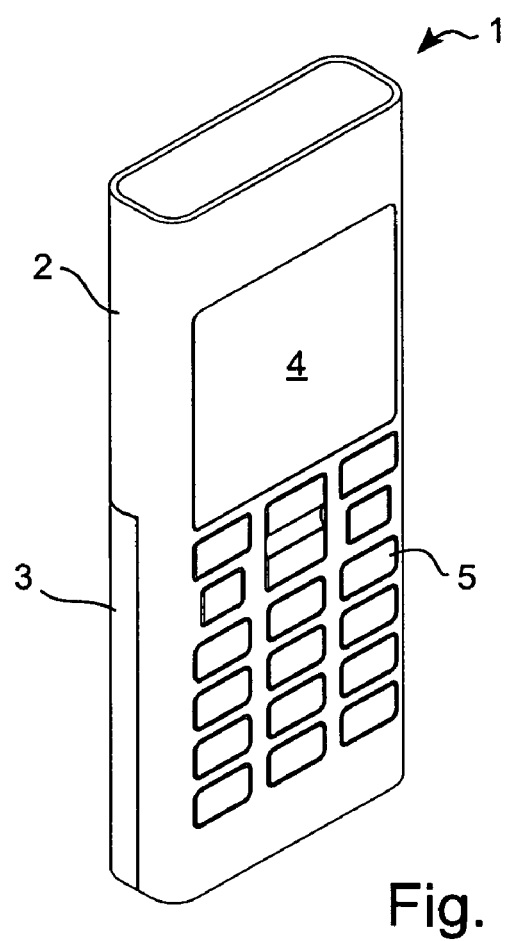
FIG. 1 shows a perspective view of a mobile phone according to some embodiments of the invention with the displaceable portion of the housing is in its "locked" position.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

It should be emphasized that in the following discussion, all the examples presented are of mobile telephones. It should however be clear to the person skilled in the art that the teachings of the invention can also be applied to other types of electronic devices, such as personal digital assistants, personal music players, laptops, and so on.

FIGS. 1-8 show some different views of a mobile phone 1 according to some embodiments of the invention. The mobile phone 1 includes a housing including a fixed portion 2 and a displaceable portion 3. The fixed portion 2 of the housing may include a display 4 and a keypad 5. The displaceable part may include a microphone 6.

Figure 2:
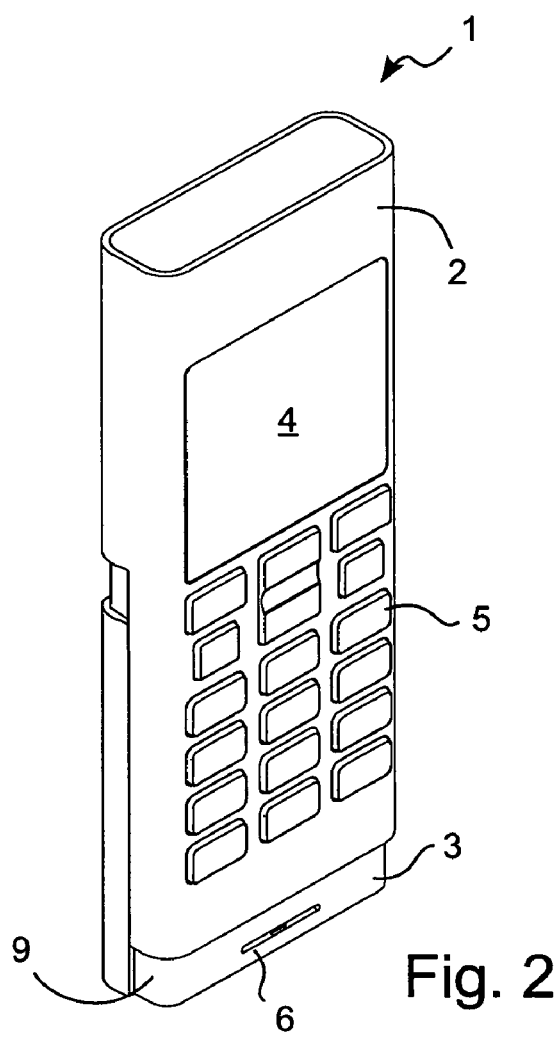
FIG. 2 shows a perspective view of the mobile phone of FIG. 1 where the displaceable portion of the housing is in its "active" position.

As can be seen by comparing FIGS. 1 and 2, the displaceable portion 3 of the housing can be put into two different positions. When the phone is to be used, the displaceable portion 3 can be displaced from the "locked" position shown in FIGS. 1 and 3-5 to the "active" position shown in FIGS. 2 and 6-8, simply by holding the phone in one hand and using a finger to slide the displaceable portion downwards. When the phone is to be put away, the displaceable portion 3 is pushed upwards into the phone. The displaceable portion 3 may be slid a distance of between 0 and 2 cm, preferably between 0 and 1 cm, most preferably between 0 and 0.5 cm when sliding between the "locked" and "active" positions.

As shown in FIGS. 1 and 2, a greater portion of the keypad 5 may be exposed in both the "locked" and "active" positions of the displaceable portion 3. As further shown in FIG. 2, in the "active" position, a part of the displaceable portion 3 may extend past a periphery of the housing. In some embodiments, the part of the displaceable portion 3 which extends past the periphery of the housing in the "active" position could include additional functional elements. For example, the extending part could include a microphone 6 or other elements, such as extra buttons, an antenna, etc.

The phone is furthermore configured in such as way that when the displaceable portion 3 is in the position shown in FIGS. 1 and 3-5 (the "locked" position), the keypad is deactivated, and when the displaceable portion 3 is in the position shown in FIGS. 2 and 6-8 (the "active" position), the keypad is activated.

The actual deactivation of the keypad can occur in many ways. One example is to use a simple switch on the displaceable portion which is activated when the displaceable portion is put into the "locked" position. When the switch is activated, the software in the phone deactivates the keypad.

Another example is to physically disconnect the mechanical parts of the keys from the switch parts of the keys in the "locked" position, such that the keypad 5 is physically disconnected from the CPU of the phone 1 when the displaceable portion 3 is in the "locked" position. This would for example be where the switch parts of the keys are connected to the displaceable portion and the mechanical parts are connected to the fixed portion of the housing. When the displaceable portion is in the "locked" position, the switch parts of the keys can be arranged such that they are not aligned with the mechanical parts of the keys. Therefore, when the user presses the mechanical parts of the keys, no action is taken since there is no connection between the mechanical parts of the keys and the switch parts of the keys. In the "active" position, the switch parts of the keys are brought into alignment with the mechanical part of the keys, thereby establishing a connection between the mechanical parts and the switch parts. Note that "mechanical part of the key" refers to the part of the key which is displaceable and "switch part of the key" refers to the part that includes the electrical switch element.

Still a further example is to physically immobilize the keys in the "locked" position of the displaceable portion. This could for example be implemented, by arranging a sliding plate which slides under the keys upon displacement of the displaceable portion into the "locked" position. This solution may also be beneficial, in that the keys are blocked in the "locked" position, thereby preventing unnecessary wear on the key mechanisms.

The mobile phone 1 may have an additional feature concerning the keypad. As can be seen from the cross section views shown in FIGS. 5 and 8, the keypad 5 may have an angled surface 7 which is in contact with a correspondingly angled surface 8 on the displaceable portion 3. In this way, when the displaceable portion 3 is displaced downwardly, the keypad 5 is displaced outwardly. When the displaceable portion 3 is displaced upwardly, the keypad 5 is retracted back into the housing 2. This effect can best be seen by comparing FIGS. 4 and 7. In this way, when the displaceable portion 3 is put into its "locked" position, the keys are protected inside the housing. The position of the keys on the keypad 5 may also allow the user to quickly detect which state the key lock is in, just by touching the phone.

Another feature which is interesting to note with the first embodiment 1 is that the phone is activated by expanding the phone (i.e. by sliding the fixed portion 2 of the phone 1 away from the displaceable portion 3 of the phone 1). This may help in preventing accidental activation of the phone, since it may be rather difficult for the phone to expand accidentally when, for example, it is being carried in the pocket of a user.

The usability of the phone may also be enhanced when the displaceable portion 3 is extended. This is due to the fact that when the displaceable portion 3 is extended, a part 9 of the phone extends past the periphery of the housing 2, thereby effectively extending the length of the mobile phone 1. In this way, when the user holds the phone in his or her hand, the user can more easily access the bottom row of keys. This is quite important in modern phones which are so small that it can be quite difficult to access the lowest row of keys.

Figure 9:
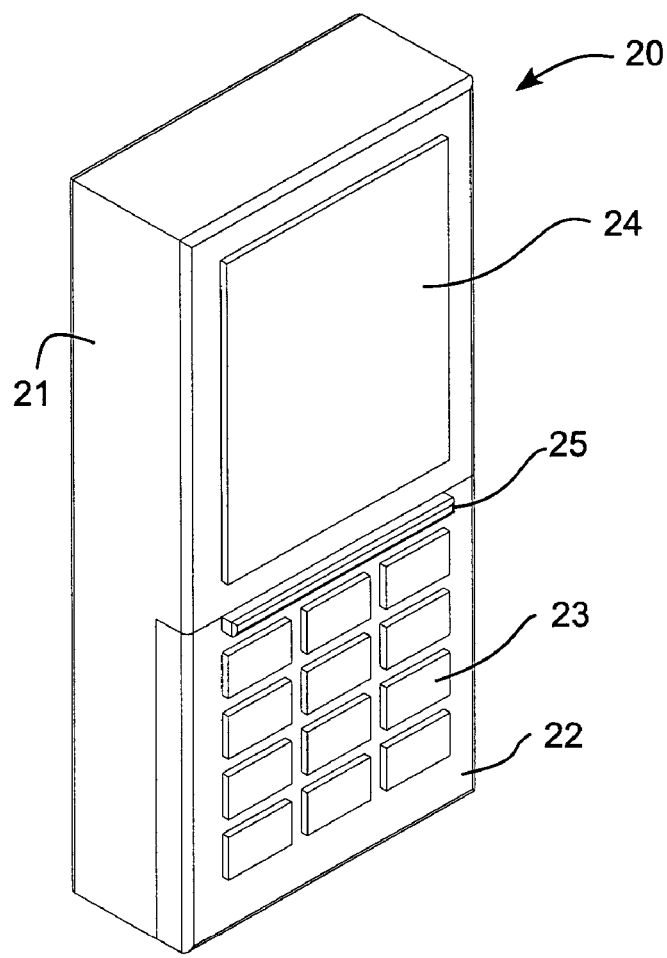
FIG. 9 shows a perspective view of a mobile phone according to further embodiments of the current invention where the displaceable portion of the housing is in its "locked" position.
Figure 10:
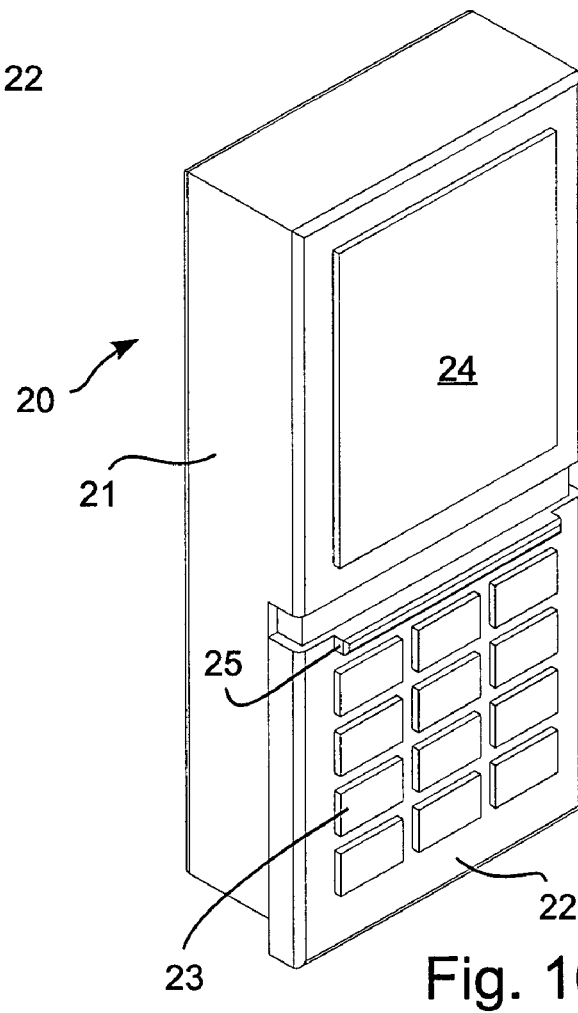
FIG. 10 shows a perspective view of the mobile phone of FIG. 9 where the displaceable portion of the housing is in its "active" position.

FIGS. 9 and 10 show a mobile phone 20 according to further embodiments of the invention. The mobile phone 20 also includes a housing with a fixed portion 21 and a displaceable portion 22. In this embodiment however, the displaceable portion 22 is arranged on the front surface of the mobile phone 20 and includes a keypad 23. The displaceable portion 22 may further include a protruding ridge 25. The fixed portion 21 includes a display 24.

When the user wishes to activate the keypad 23, the user may hold the phone 20 in his or her hand and may push the displaceable portion 22 downwards (i.e. away from the display 24), for example by applying downwards pressure on the protruding ridge 25. When the user wishes to deactivate the keypad 23, the user may push the displaceable portion 22 upwards, for example by applying pressure on the protruding ridge 25 in an upwards direction (i.e. toward the display 24). It should be noted that the protruding ridge 25 is not necessary, but may make it somewhat easier to displace the displaceable portion 22.

The protruding ridge 25 could also be formed as an extra locking element for the displaceable portion 22 to stop the displaceable portion 22 from displacing when it is in the "locked" position. For example, the protruding ridge 25 could be formed as a push button which needs to be pushed into the phone before it is possible to slide the displaceable portion 22. This may further decrease the risk that the displaceable portion 22 will be accidentally displaced, since the user needs to both push the protruding ridge 25 into the housing, while at the same time applying downwards pressure to slide the displaceable portion 22 downwards.

In some embodiments, it is possible that the keypad 23 attached to the displaceable portion 22 may include only the mechanical parts of the keys and not the switch parts of the keys of the keypad 23. In that case, the switch parts of the keys may be connected to the fixed portion 21 of the housing. In the "locked" position, the mechanical parts of the keys may be offset from the switch parts of the keys. In this position, when the mechanical parts of the keys are pressed, no action may be taken, because the switch part of the keys would not be triggered. When the user slides the displaceable portion 22 downwards, the mechanical parts of the keys are brought into alignment with the switch parts of the keys and the keypad 23 is thereby activated. One of the benefits of this solution is that the displaceable portion 22 may not include any electrical parts. In this case, no electrical connection needs to be provided between the displaceable portion 22 and the fixed portion 21.

In some embodiments of the invention, such as the embodiments illustrated in FIGS. 1 and 2, the displaceable portion 3 is arranged on the side of the housing opposite to the side of the housing on which the keypad 5 and/or the display 4 are arranged. However, in other embodiments, such as the embodiments illustrated in FIGS. 8 and 9, the sliding portion includes the keypad 23 and/or is located on the same side of the housing as the display 24.

It should be obvious to the person skilled in the art that the teachings of the current invention can be applied in many different ways, and that the embodiments described above are just two of very many different embodiments which fall within the scope of the current invention.

For example, in both the embodiments described above, the displaceable portion is displaced downwards in the active position. However, in some embodiments of the invention, the displaceable portion may be displaced upwards or sideways. It is also possible that the displaceable portion may be displaced with a motion other than sliding. For example, the displaceable portion could be rotated.

Furthermore, other functional elements could be integrated into the displaceable portion. For example, the displaceable portion could include extra keys which appear when the displaceable portion is displaced into its "active" position.

Another example could be where the displaceable portion includes a portion of the antenna. In this way, the antenna performance could be increased in the "active" position of the displaceable portion.

It is to be noted that the figures and the above description have shown the example embodiments in a simple and schematic manner. The internal electronic and mechanical details have not been shown since the person skilled in the art should be familiar with these details and they would just unnecessarily complicate this description.

Furthermore, as previously stated, it should be mentioned that the teachings of the current invention could also be applied to devices other than mobile phones.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A portable communication device, comprising: a housing comprising a first portion including a display and a keypad arranged on an outer surface of the first portion and comprising a displaceable portion that is slideably attached to the first portion; wherein the the displaceable portion is displaceable between a "locked" position in which the keypad is deactivated and an "active" position in which the keypad is activated.

2. A portable communication device according to claim 1, wherein a greater portion of the keypad is exposed in both the "locked" and the "active" position of the displaceable portion.

3. A portable communication device according to claim 1, wherein the displaceable portion is slideable a distance of between 0 and 2 cm when sliding between the "locked" and "active" positions.

4. A portable communication device according to claim 1, wherein the displaceable portion is slideable a distance of between 0 and 1 cm when sliding between the "locked" and "active" positions.

5. A portable communication device according to claim 1, wherein the displaceable portion is slideable a distance of between 0 and 0.5 cm when sliding between the "locked" and "active" positions.

6. A portable communication device according to claim 1, wherein in the "locked" position of the displaceable portion, the keys of the keypad are mechanically immobilized.

7. A portable communication device according to claim 1, wherein in the "locked" position of the displaceable portion, the keypad is disconnected from a CPU of the electronic device.

8. A portable communication device according to claim 7, wherein the part of the displaceable portion which extends past the periphery of the housing in the "active" position of the displaceable portion comprises an additional functional element.

9. A portable communication device according to claim 1, wherein the displaceable portion comprises a locking element configured to prevent the displaceable portion from displacing when it is in the "locked" position.

10. A portable communication device according to claim 1, wherein in the "active" position of the displaceable portion, a part of the displaceable portion of the housing extends past the periphery of the housing.

11. A portable communication device according to claim 1, wherein the displaceable portion is arranged on a side of the first portion of the housing opposite to a side of the first portion of the housing comprising the keypad.

12. A portable communication device according to claim 1, wherein the portable communication device is a mobile telephone.

13. A portable communication device, comprising:
 a housing
 a keypad arranged on an outer surface of the housing, wherein the housing comprises a displaceable portion that is displaceable between a "locked" position in which the keypad is deactivated and an "active" position in which the keypad is activated; and
 an angled feature provided at an interface between the displaceable portion and the keypad, the angled feature arranged to urge the keypad outwardly from the housing when the displaceable portion is moved away from the housing.

14. A portable communication device according to claim 13, wherein the keypad is displaced outwardly from the housing when the displaceable portion is moved into the "active" position, and the keypad is retracted back into the housing when the displaceable portion is moved in to the "locked" position.

15. A portable communication device according to claim 13, wherein the angled feature is on the displaceable portion.

16. A portable communication device according to claim 13, wherein the angled feature is on the keypad.

17. A portable communication device, comprising:
 a housing comprising a first portion including a display and
 a keypad arranged on an outer surface of the first portion and comprising a displaceable portion that is slideably attached to the first portion; and
 a CPU disposed within the housing and configured to control operations of the electronic device;
 wherein the displaceable portion is displaceable between a "locked" position in which the keypad is deactivated and an "active" position in which the keypad is activated, and wherein in the "locked" position of the displaceable portion, the keys of the keypad are physically disconnected from the CPU.

18. A portable communication device according to claim 17, wherein the keypad comprises a mechanical part and a switch part, and wherein the mechanical part is offset from the switch part when the displaceable portion is in the "locked" position.

19. A portable communication device according to claim 17, wherein keys of the keypad are mechanically immobilized when the displaceable portion is in the "locked" position.

* * * * *